INCREMENTING APPARATUS

Filed Dec. 11, 1964 2 Sheets-Sheet 1

INVENTOR.
WILLIAM L. DOLLENMAYER

BY D. Kendall Cooper

ATTORNEY.

Jan. 23, 1968 W. L. DOLLENMAYER 3,365,200

INCREMENTING APPARATUS

Filed Dec. 11, 1964 2 Sheets-Sheet 2

FORWARD SPACE BACK SPACE 3,365,200
Patented Jan. 23, 1968

3,365,200

INCREMENTING APPARATUS

William L. Dollenmayer, Lexington, Ky., assignor to International Business Machines Corporation, Armonk, N.Y., a corporation of New York Filed Dec. 11, 1964, Ser. No. 417,649
16 Claims. (Cl. 274—21)

ABSTRACT OF THE DISCLOSURE

An incrementing apparatus has an operating member pivoted on a magnetic head carrier. An auxiliary member is pivoted on the operating member and has oppositely extending forward spacing and backspacing pawls for alternate engagement with a lead screw drive. A spring biases a detent on the operating member toward engagement with the screw. When the operating member is pivoted out of engagement in oposition to the bias, the carrier will be incrementally moved in a direction that is dependent upon which pawl is in engagement.

Many different types of dictating machines are available today. Their usefulness in the preparation of letters, documents, and other dictated materials is well known. Dictating machines are normally provided with a main housing for accommodating a recording media, such as a magnetic belt, a transducer for recording on the media and reproducing signals therefrom, drive mechanisms and other mechanisms for performing various functions in the apparatus, and circuits involved in translating dictated or reproduced signals. Also, such machines normally have a handpiece microphone attached thereto which may be held by the dictator and which has buttons and switches for controlling machine functions.

During the recording of dictation or its reproduction, the transducer (such as a magnetic head that is associated with the magnetic belt recording media) is normally moved from a beginning position with respect to the media to an end or limit position. Concurrently with movement of the transducer, the belt is rotated thereby resulting in a helical path being traced on the belt. The same applies during a transcription operation when a headset and associated foot controls are attached to the machine for controlling machine functions and previously recorded dictated material is reproduced. If recording or reproduction were to proceed in an uninterrupted fashion, the helical recording path would be traced in a continuous manner from beginning to end with no interruptions or change in direction. Normally, however, the dictator or transcriber frequently has to listen to recorded material that is displaced either in a reverse direction from the present transducer location or in a forward direction with respect to the present transducer location. In the case of dictation, for example, this occurs when the dictator has dictated certain material, and later desires to redictate portions of the material. The transcriber as another example, may wish to transcribe particular portions of dictated material before other portions, and this may require backspacing or forwardspacing to find the desired material. Usually, some means is provided for manually moving the transducer the entire length of the belt from beginning to end or from end to beginning in either direction as desired by the operator of the equipment. If this means is used to return the transducer to a particular location on the belt, the transducer may be positioned past the area desired. Therefore, it is desirable to have means for reversing or backspacing the transducer in relation to the recording media. It is desirable to have some provision for advancing or reversing the transducer until the dictator gets to the point desired.

While certain mechanisms have been developed for advancing or reversing the transducer in the equipment in order to advance to a desired location on the recording media or to revert to a particular previous position on the recording media along the previously traced helical path, these mechanisms have usually been characterized by the large amount of time that is necessary in order for the transducer to retrace its path in a forward or reverse direction. Therefore, an incremental spacing type of device may be far more useful, since it is more rapid in operation. During the tracing of the helical path by the recording head on the recording media, the drive is normally effected through a lead screw and carrier arrangement wherein rotation of the lead screw results in a follower mechanism being moved along the threads of the screw from the beginning to end of the recording media. Since this is normally the way that the head is driven in relation to the belt, a predetermined incremental distance will always exist between successive convolutions in the helical path due to the fact that they are established under control of the threaded lead screw which is threaded according to a predetermined pitch. Ordinarily, some means is provided to inform the dictator or transcriber as to the relative location of the recording or reproducing head with respect to the recording media and, as mentioned to enable the positioning of the head with respect to the recording media at any position from the beginning of the recording media to the end, as circumstances may require. Since a predetermined relationship exists between the successive loops or convolutions on the helical path and the lead screw, it is therefore desirable that any spacing either in a forward or backward direction take place in the increments that correspond exactly to the incremental spacing between the convolutions in the recording path. A spacing device of this nature inherently offers certain advantages over the continuous forward or reverse driving type of mechanism which has to retrace or advance along the path in any direction since the transducer can be incremented from a particular point on one convolution to the corresponding point on the next succeeding or next preceding convolution in a rapid and efficient manner. It is apparent of course that the mechanisms can be designed to effect spacing in either a forward or reverse direction with an increment of more than the distance between successive paths, but this is not ordinarily the case.

In certain dictating telecommunication systems, as another example, it is customary to provide means for the dictator to backspace or review previously dictated material. In these systems it happens sometimes that the dictator after listening to only a small part of the previously dictated material may hang-up. In order to avoid losing the material that was dictated, some means is usually provided for advancing the transducer under control of voice signals or by some type of advance marking mechanism to the farthest point of dictated material. A forward spacing mechanism has utility in an enviroment of this nature also.

(2) *Prior art*

A number of devices have been proposed in the prior art for performing backspacing and forward spacing operations. However, for some time, it has been desirable to have a device that would perform these operations in a manner that would avoid the complexities and bulkiness of prior devices.

*Objects*

Therefore, an object of the invention is to provide a simplified incrementing mechanism.

Another object of the invention is to provide an incrementing mechanism that is capable of backspacing operation as well as forward spacing operation.

A further object of the invention is to provide an incrementing mechanism of compact size and with a minimum number of active working elements.

*Summary*

In order to accomplish these and other objects of the invention, an incrementing apparatus is arranged with a common operating member that is selectively active both during a backspacing operation and during a forward spacing operation with an auxiliary member that controls the effective direction of movement of the apparatus.

Also, the apparatus of the present invention is designed in such a manner that high speeds of operation and accuracy are insured.

The foregoing and other objects, features, and advantages of the invention will be apparent from the following more particular description of the preferred embodiment of the invention as illustrated in the accompanying drawings.

FIGS. *4a–4d* illustrate a sequence of operations encountered during spacing in a particular direction, such as a forward spacing direction.

FIGS. *5a–5c* illustrate a sequence of operations encountered during movement of the apparatus in the opposite direction, such as a backspacing direction.

*Detailed description*

Figures 1, 2, 3:
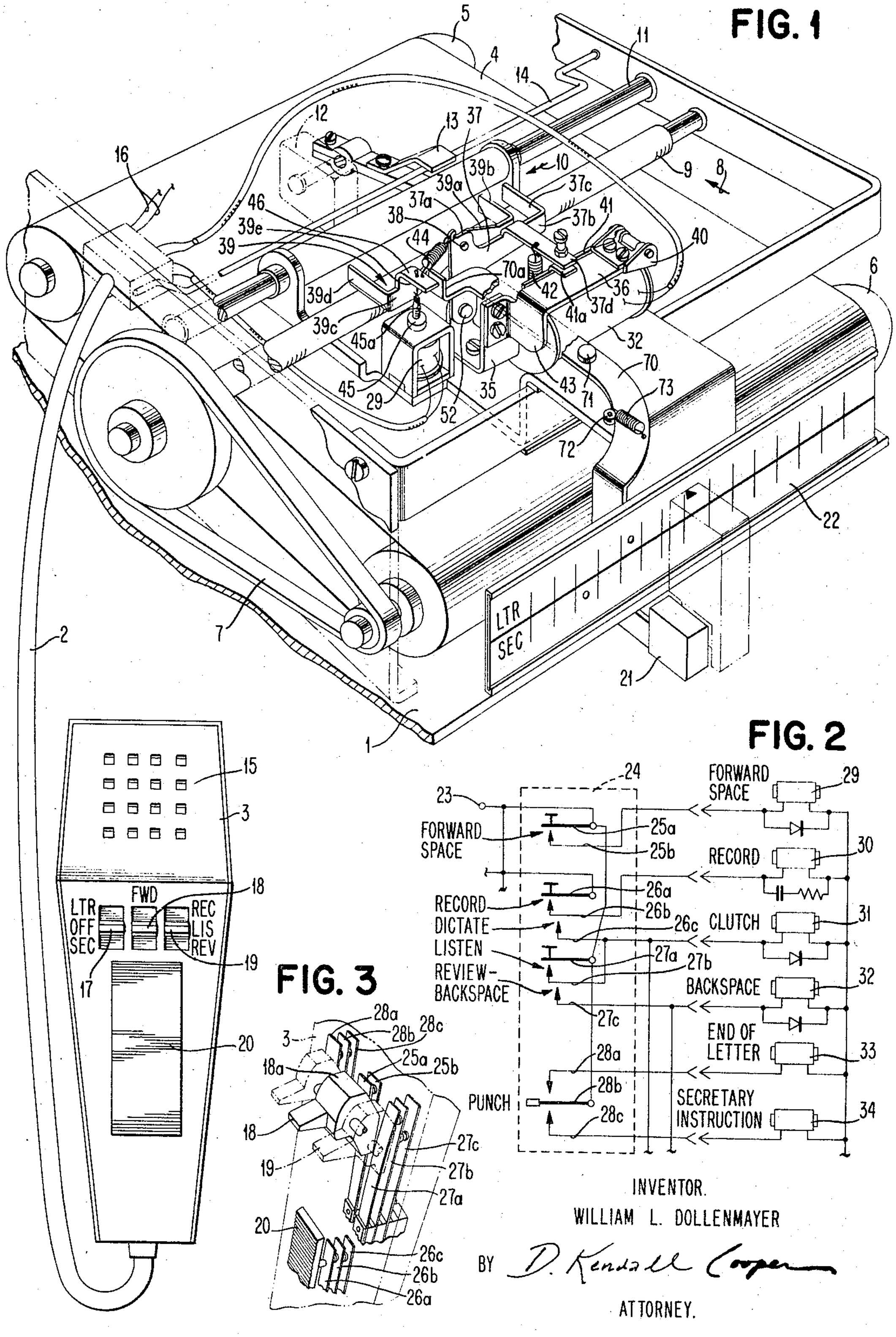
FIG. 1 is a diagrammatic perspective view of a dictating apparatus in which the invention is incorporated, the dictating apparatus having an associated microphone.
FIG. 2 is a simplified circuit diagram of certain elements required for operation of the apparatus of FIG. 1.
FIG. 3 shows a possible switch configuration for use in the microphone assembly associated with the dictating apparatus of FIG. 1.

FIG. 1 illustrates certain major portions of a dictating apparatus. The apparatus is not shown in complete detail but reference is made to a comparable dictating apparatus in U.S. application Ser. No. 216,261 entitled "Multiple Station Selection System," N. J. Albanes and M. P. Langendorf inventors, filed Aug. 10, 1962, and assigned to the same assignee as the present application. The dictating machine, designated 1, is interconnected by a cable 2 to a handpiece or microphone 3. Machine 1 has a number of circuits and mechanisms for recording and reproducing dictated material as well as driving the recording media, and performing spacing operations as required. A belt 4 is mounted on mandrels 5 and 6. Mandrel 6 is rotated by means of a drive belt 7, and associated motor and clutch drive means, not shown. The normal movement of belt 4 during recording or reproduction is in a direction indicated by arrow 8.

Associated with the driving mechanisms is a lead screw 9 that is also driven by means of the drive belt 7 in a coordinated and synchronized manner with the rotation of belt 4. As belt 4 moves in the direction indicated by arrow 8, lead screw 9 is rotated and through a carrier assembly 10 that is slidably mounted on a rod 11, moves a magnetic recording and reproducing head 12. Head 12 has a slider 13 that is positioned adjacent a rotatable rod 14. Rod 14 can be rotated to lift head 12 away from belt 4, such as may be required during loading or unloading of belts into the machine. The exact details of mechanical relation between head 12 and lead screw 9 are not discussed herein but are discussed fully in the aforementioned Albanes et al. application. The relative movements of belt 4 and head 12 in the manner just described results in a generally helical path being traced on belt 4 as dictation or transcription proceeds. The beginning of the recording path is generally at the left extremity of belt 4 in FIG. 1 while the end of the path is generally at the right extremity of belt 4 in FIG. 1. Movement of the head 12 incrementally to the left in relation to belt 4 in FIG. 1 is characterized as a backspacing operation while movement of head 12 incrementally to the right with respect to belt 4 in FIG. 1 is conversely characterized as a forward spacing operation.

Microphone 3 has a transducer area 15 that serves both to receive dictated signals for recording on belt 4 and also as a miniature speaker for transducing output signals from belt 4 during reproduction. Signals to and from transducer 15 are considered to pass by means of wires 16 to various circuits not shown, but that are described in the Albanes et al. application. Microphone 3 has an instruction button 71, a forward spacing button 18 and a mode control button 19. Instruction button 17 has three positions: Letter (LTR), Off, and Secretary (SEC). Forward spacing button 18 is movable from the position shown in FIG. 1 to a lower position to effect a forward spacing operation of the apparatus in FIG. 1. Mode control button 19 has three positions: a Record (REC) position, a Listen (LIS) position, and a Review (REV) position in which a backspacing operation of the apparatus is effected. Microphone 3 also has a dictate bar 20.

Machine 1 has an index control knob 21 that can be depressed manually by the operator in order to free carrier 10 and magnetic head 12 from lead screw 9 for positioning head 12 laterally either to the right (Forward) or to the left (Backward) to any extent desired by the operator.

In order to record material on belt 4, mode control button 19 on microphone 3 is moved to the upper Record position. When the user of the equipment desires to dictate, he depresses the dictate bar 20 which results in movement of belt 4 in a direction indicated by arrow 8 and movement of head 12 as previously discussed. Through circuits not shown, the signals received by transducer 15 are then recorded on belt 4 in the helical path produced by the combined movements of belt 4 and head 12. In order to listen to previously dictated material, the dictator moves the mode control button 19 to the central Listen position whereupon the drive mechanisms in the apparatus are automatically operated to effect a forward movement of head 12 to trace along the path and reproduce the previously recorded signals. If the dictator desires to listen to material that has been previously dictated, a backspacing operation can be effected by moving button 19 to the lower Review position whereupon the novel mechanisms according to the present invention become effective to increment head 12 one space in the backward direction, which is to the left in FIG. 1. Button 19 is spring loaded from the lower position to the central position. Each time button 19 is depressed to the lower position, a backspacing operation will take place. However, the spring loading arrangement requires that button 19 return to the Listen position which then enables the dictator to listen to previously recorded material with signals being picked up by head 12 and supplied through transducer 15.

As described in the aforementioned Albanes et al. application machine 1 has provision for perforating an index slip 22 with certain End-of-letter perforations or Secretary instruction perforations, under control of button 17 on microphone 3. Index slip 22 has an upper Letter (LTR) channel and a lower Secretary (SEC) channel for accommodating the two types of perforations normally required. Movement of button 17 to the upper Letter (LTR) position results in perforation of the slip 22 in the upper channel by mechanisms shown in the Albanes et al. application. Movement of button 17 to the lower Secretary (SEC) position results in the perforation of index slip 22 in the lower channel. Movement of the indexing selector knob 21 takes place laterally as the carrier assembly 10 moves along rod 11 and indexing lever 21 serves to indicate the relative position of head 12 with respect to belt 4 as recording or transcription proceeds.

FIG. 2 shows certain circuits and electrical components that are usable in the operation of the apparatus of FIG. 1. A potential of particular level is supplied at terminal 23 and made available to various contacts that are housed in microphone 3 as indicated in the dashed box 24. The contacts shown in box 24 in top to bottom order are the Forward Space contacts 25*a* and 25*b*, the Record and Dictate contacts 26*a*, 26*b*, and 26*c*, the Listen and Review (Backspace) contacts 27*a*, 27*b* and 27*c*, and the Punch contacts 28*a*, 28*b*, and 28*c*.

The closure of the forward space contacts is effected by operation of button 18 on microphone 3 and results in the energization of the forward space solenoid 29. Depression of dictate bar 20 closes the contacts 26*a*, 26*b*, and 26*c* and results in the operation of Record relay 30 and the energization of clutch magnet 31. Actuation of the machine clutch causes rotation of belt 4 and movement of head 12 as previously described. Movement of mode control button 19 to the central Listen position opens contacts 26*a*, 26*b* and 26*c* to drop out the Record relay 30, but continues the energization of clutch magnet 31, through contacts 27*a* and 27*b*, thereby effecting movement of belt 4 and head 12 in order to reproduce previously recorded signals. Further movement of button 19 downward into the Review or Backspace position results in the closure of all contacts 27*a*, 27*b*, 27*c* and both the clutch magnet 31 and the backspace solenoid 32 are operated.

Movement of button 17 to the upper Letter position results in closure of contacts 28*a* and 28*b* to energize the End-of-letter solenoid 33. Movement of the instruction button 17 to the lower position closes contacts 28*b* and 28*c* to energize the Secretary instruction solenoid 34.

Certain of the structural arrangements of the control buttons and associated switches are shown in FIG. 3. These assemblies are also fully considered in the aforementioned Albanes et al. application. However, certain modifications to the button 18 have been made in the present assembly. These modifications include the provision of a larger operating portion 18*a* of button 18 which not only extends in position to operate contacts 25*a* and 25*b* which also extends over adjacent the contacts 27*a*, 27*b* and 27*c* which is the Listen-Review-Backspace contact assembly. In the spacing mechanism of the present invention, the backspace solenoid 32 is energized for a backspace operation, while both the forward space magnet 29 and the backspace magnet 32 are operated in that sequence in order to effect a forward spacing operation. This is accommodated by the assemblies in FIG. 3 by providing that knob 19 operate only Listen-Review-Backspace contacts 27*a*, 27*b* and 27*c* but that forward space knob 18 operate both the forward space contacts 25*a* and 25*b* and the Listen-Review-Backspace contacts 27*a*–27*c*, in that order.

Referring again to FIG. 1, the incrementing mechanisms of the preferred embodiment include the backspace solenoid 32 and the forward space solenoid 29. Certain mechanisms associated with the spacing apparatus are shown in FIG. 1 and are also shown in greater detail and with a more exact spatial relationship in FIGS. 4*a*–4*d* and FIGS. 5*a*–5*c*. An over-all perspective view of the combined forward and backspacing mechanism is shown in FIG. 1, while the specific relationships of the elements involved are illustrated in the FIGS. 4*a*–4*d* and 5*a*–5*c*.

Mounted to head carrier 10 is a bracket member 35. Forward space solenoid 29 is also mounted on head carrier 10. Extending from bracket 35 is another bracket 36 on which the backspace solenoid 32 is mounted. Pivotally mounted on bracket 35 is a first operating lever member 37 having a first arm 37*a* extending upwardly in a generally perpendicular manner. Arm 37*a* has a stud 38 positioned near its extremity. Extending to the right on member 37 is a second arm 37*b* having a detent extension 37*c* that is normally in engagement with lead screw 9.

Pivotally and centrally mounted on stud 38 is a second operating auxiliary lever member 39. Operating member 39 has a first arm 39*a* with a backspace pawl portion 39*b* that extends generally in the same direction as arm 37*b* of member 37, but of slightly shorter length. Backspace pawl portion 39*b* is also normally engaged with lead screw 9. Extending in the opposite direction on member 39 is an arm 39*c* having a forward space pawl portion 39*d*. Pawl 39*d* is positioned for engagement with lead screw 9, but is normally disengaged therefrom. Also extending from member 39 is an extension 39*e* that extends above solenoid 29. Associated with solenoid 32 is a bracket assembly 40 having an armature 41 mounted for pivotal movement thereon. Armature 41 has an extension 41*a* that is contiguous with and extends underneath an extension 37*d* of member 37. Extension 37*d* has an adjusting screw 47 positioned in an aperture therein for establishing contact between extension 37*d* and extension 41*a*.

Connected to extension 37*d* of member 37 is a coil spring 42. Spring 42 is connected between extension 37*d* and the carrier at 43. Connected between arm 37*a* of member 37 and extension 39*e* of member 39 is a spring 44. Spring 42 has a compression strength of a predetermined amount while spring 44 preferably has a compression strength of an amount that is less than that of spring 42. Spring 42 therefore can be characterized as a "heavy" spring while spring 44 can be characterized as a relatively "light" spring.

Solenoid 29 is of the plunger type with a plunger 45 that is adapted for vertical movement within the central core of solenoid 29 as it is energized and de-energized. Plunger 45 has an extension 45*a* with a wire connecting member 46 that serves to connect plunger 45 to extension 39*e* of member 39 for operation by solenoid 29.

*Forward spacing operations*

A forward space operation will first be discussed in connection with FIGS. 4*a*–4*d*, followed by a backspace operation in connection with FIGS. 5*a*–5*c*.

Assuming that a forward spacing operation is required, button 18 is pressed to close contacts 25*a* and 25*b*. This results in the energization of solenoid 29 which then draws plunger 45 downward. The normal conditions of the various mechanisms are shown in FIG. 4*a*. Detent 37*c* and backspace pawl 39*b* are normally engaged with lead screw 9 a predetermined distance or number of increments apart in order to conform with the number of threads per inch and the pitch of lead screw 9, and taking into account the relative sizes and positions of the various portions of the apparatus. In this instance, the number of increments between detent 37*c* and backspace pawl 39*b* is five. This spacing is not critical and other distances may be selected instead. Forward space spawl 39*d* is normally disengaged from lead screw 9. Energization of solenoid 29 through plunger 45 results in the rocking of member 39 so that backspace pawl 39*b* becomes disengaged from lead screw 9 and forward space pawl 39*d* becomes engaged with lead screw 9 a predetermined incremental distance away from detent 37*c*. The distance shown in FIG. 4*b* is twenty-four, but may be varied widely.

It will be recalled that movement of forward space button 18 results in the closure of contacts 25*a* and 25*b* and backspace contacts 27*a*–27*c*, in that order. Therefore, following the energization of solenoid 29 through forward space contact assembly 25, backspace solenoid 32 is energized by the closure of backspace contacts 27*b* and 27*c*. Referring to FIG. 4*c*, this results in the pivoting of armature 41 in a clockwise direction in relation to its position in FIGS. 4*a* and 4*b*. The extension 41*a* on armature 41 contacts the adjusting screw 47 that is positioned on extension 37*d* of member 37. This results in the disengagement of detent 37*c* from lead screw 9. As a consequence of the foregoing action, member 37 is pivoted in a counterclockwise direction about the stud 38. Since forward space pawl 39d is now engaged with lead screw 9 as a result of the previous energization of solenoid 29 and movement of plunger 45, the pivoting of member 37 about stud 38 results in the movement of the lower extremity of member 37 in a direction indicated by arrow 48 in FIG. 4c. Arm 39c of member 39 is urged toward lead screw 9 in a direction indicated by arrow 60. A reaction force exerted by lead screw 9 against pawl 39d, as indicated by arrow 61, tends to more firmly engage pawl 39d with lead screw 9, as member 37 is operated. The dimensional relationships of the parts incorporated in the mechanism are such that the resulting movement of the lower portion of member 37 corresponds to approximately one increment of space on the belt 4 and, correspondingly, one thread on lead screw 9. Since the carrier 10 is attached to the lower extremity of member 37, carrier 10 will also move one increment in the forward direction in FIG. 4c. The movement of the assembly can be observed by referring to the line 49 which represents the position of the assembly before the current forward spacing operation is performed. Line 50 represents the new position of the assembly one increment in a forward direction.

Figures 4A, 4B, 4C, 4D, 5A, 5B, 5C:
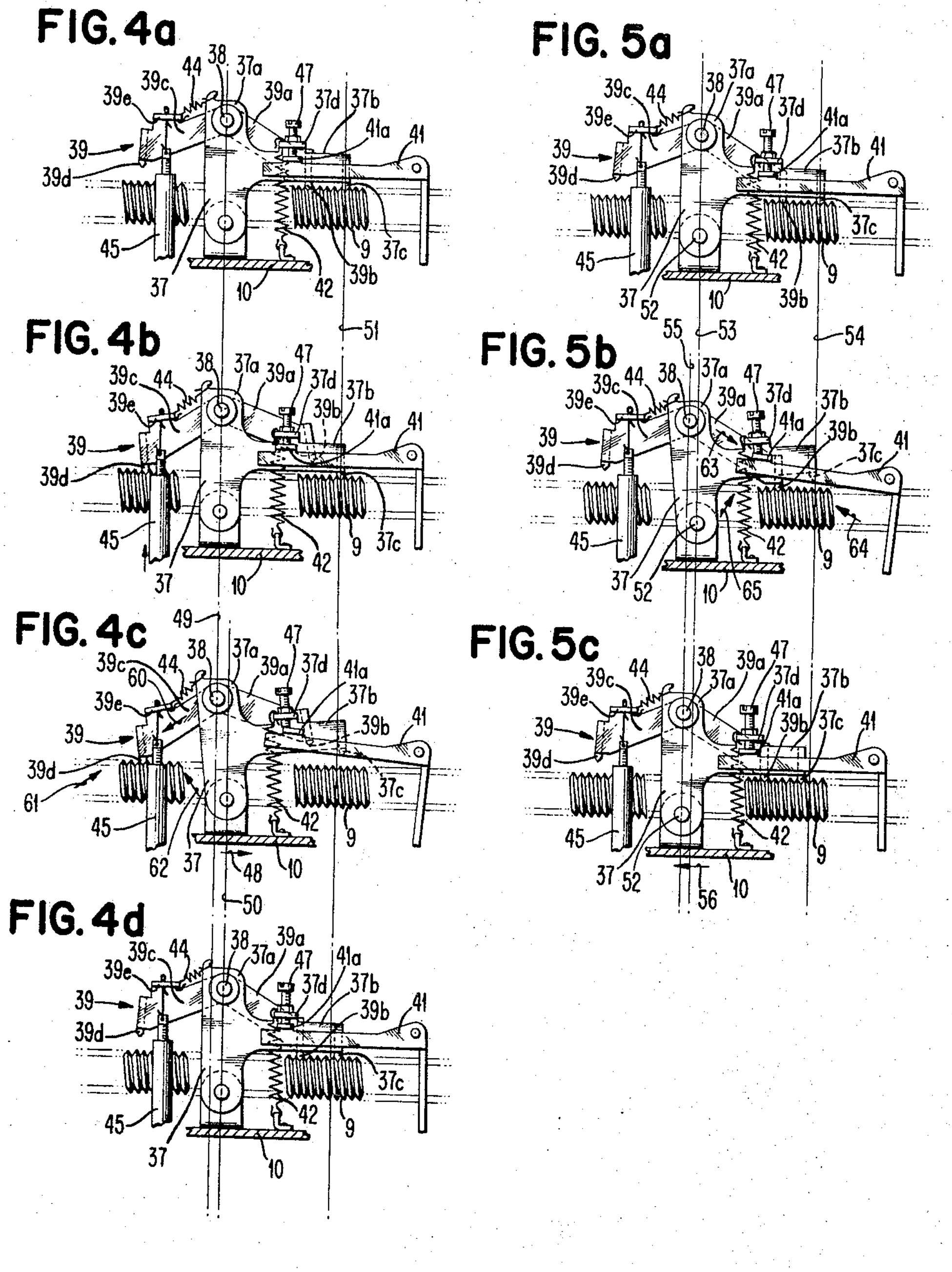

Following the action in FIG. 4c, both solenoids 32 and 29 are sequentially de-energized when button 18 is returned to its normal central position on microphone 3, FIG. 1. In FIG. 4d, the assembly takes up a new position one increment to the right of the old position, which is in the forward direction. When solenoid 32 is de-energized spring 42 pulls member 37 rapidly into engagement with lead screw 9. Since solenoid 29 is still energized for a brief interval of time following the de-energization of solenoid 32, pawl 39d is still engaged with lead screw 9. However, the force relationships of pawl 39d and lead screw 9 are now such that pawl 39d is easily cammed over the tooth of lead screw 9 into the next tooth to the right in FIG. 4c. This occurs because the reaction force exerted by lead screw 9 is at an angle as indicated by arrow 62, and also because of the relatively light characteristics of spring 44 in relation to spring 42.

Detent 37c and backspace pawl 39b will again become engaged with lead screw 9, except that they will now be one tooth to the right on lead screw 9. This is evident by a visual observation of the location of detent 37c and backspace pawl 39b in relation to the reference line 51. FIGS. 4a–4d.

Once member 37 and associated carrier assembly 10 are moved to the right as shown in FIG. 4c, they tend to remain in the new position when solenoids 29 and 32 are de-energized. This is due to some extent to the frictional contact between head 12 and belt 4, the inertia of carrier assembly 10, and is also due to some extent to the relatively heavier characteristics of spring 42 in relation to spring 44.

*Backspacing operation*

A backspacing operation will be discussed in connection with FIGS. 5a–5c. In order to perform a backspacing operation, button 19 is moved to the lower Review-Backspace position. This closes contacts 27a, 27b, and 27c and energizes solenoid 32. During a backspacing operation and according to one of the features of the present invention, it is necessary to energize only solenoid 32 and solenoid 29 remains inactive.

The normal condition of the mechanism is shown in FIG. 5a with detent 37c and backspace pawl 39b in engagement with lead screw 9. Forward space pawl 39d is disengaged in FIG. 5a and remains disengaged throughout the entire backspacing operation.

Movement of button 19 to the lower position and the subsequent energization of backspace solenoid 32 results in the clockwise movement of armature 41. Extension 41a of armature 41 again contacts screw 47 in extension 37d of member 37 and raises member 37 upward as shown in FIG. 5b. The result of this action is that the arm 37a of member 37 moves in a counterclockwise direction about pivot connection 52 which serves to connect member 37 to the carrier 10. The reaction force of lead screw 9 on backspace pawl 39b is indicated by arrow 65. The force relationships established are such that backspace pawl 39b is cammed over a tooth of lead screw 9 and re-engages lead screw 9 one tooth to the left, FIG. 5b. Arm 37a of member 37 is designed in such a manner that the net movement to the left corresponds approximately to one increment of space on belt 4 and one thread on lead screw 9. The former position of the assembly is referenced to lines 53 and 54 and the new position of the assembly is referenced to line 55.

Following the depression of button 19 to the Review-Backspace position, button 19 is released with the spring loading returning it to the central Listen position. Solenoid 32 then becomes de-energized and armature 41 returns to its former position in a counterclockwise direction. This enables member 37 to move in a clockwise direction under the urging of spring 42. The movement of member 37 this time, however, takes place about the pivot stud 38 instead of the pivot 52. This occurs because spring 42 pulling on member 39 changes the force relationships. The reaction force of lead screw 9 on backspace pawl 39b, as indicated by arrow 64, is such that the pawl 39b is urged more firmly into engagement with lead screw 9 and thus arm 39 and pivot 38 become fixed relative to lead screw 9.

The net result of the foregoing is that the assembly including carrier 10 is moved to the left one increment in the backspace direction as indicated by arrow 56. The carrier assembly 10, including head 12, have now taken up a new position one increment to the left in the backspace direction with respect to belt 4.

From the previous discussion, it is seen that carrier 10 is incremented in a particular first direction or in the opposite direction in a selective manner depending on the condition of auxiliary lever member 39. If member 39 is rotated counterclockwise from its normal position into engagement with its left extremity with lead screw 9, a forward spacing operation will occur when member 37 is actuated. If member 39 is permitted to remain in its normal position with its right extremity engaged with lead screw 9, then a backspacing operation will occur when member 37 is actuated. The condition of member 39, therefore determines the pivoting action of member 37 and the direction of movement of the entire assembly including carrier 10 and magnetic head 12.

It is apparent that the elements involved in the novel apparatus disclosed herein could be arranged in such a fashion that a backspacing operation takes place by the sequence illustrated in FIGS. 4a–4d rather than a forward spacing operation and that a forward spacing operation takes place by the sequence discussed in connection with FIGS. 5a–5c rather than a backspacing operation. The principles of the invention result in an apparatus which is structurally compact and which provides for simplified spacing operations. Both a forward spacing and a backspacing operation are selectively provided in a single unitary assembly according to the desires of the user of the equipment.

Index knob 21 has a lever arm 70 associated therewith that is pivotally mounted at 71. Arm 70 is normally maintained against a stud 72 by a spring 73. Movement of knob 21 to the right in FIG. 1 rotates arm 70 about pivot 71 so that extension 70a engages extension 39e of member 39. In this manner, the incrementing mechanisms can be disengaged from lead screw 9 in the event the user of the equipment wants to move carrier 10 and head 12 to the right or to the left manually rather than under control of microphone 3 as described.

While the invention has been particularly shown and described with reference to a perferred embodiment, it will be understood by those skilled in the art that various changes in form and detail may be made without departing from the spirit and scope of the invention.

What is claimed is:

1. Bi-directional incrementing apparatus comprising:
a lead screw;
an assembly mounted for movement longitudinally of said lead screw;
a first operating member pivotally coupled to said assembly at a first pivot point, said first operating member having a detent normally engaged with said lead screw means;
first spring means for biasing said detent toward normal engagement with said lead screw means;
a second operating member, said second operating member being centrally and pivotally mounted on said first operating member at a second pivot point and said second operating member having first and second pawl carrying arms extending longitudinally of said lead screw and engageable therewith;
second spring means operative normally to maintain a first pawl of said second operating member in engagement with said lead screw;
control means selectively operative to disengage said first pawl of said second operating member from said lead screw and to engage said second pawl of said second operating member with said lead screw;
and means operative to pivot and thereby disengage the detent of said first operating member from said lead screw in opposition to said first spring means whereby the pivoting action between said first operating member and said second operating member moves said assembly in a first direction when the first pawl of said second operating member is in its normally engaged position with said lead screw and whereby the pivoting action between said first operating member and said second operating member move said assembly in the opposite direction when the second pawl of said second operating member is engaged with said lead screw.

2. Incrementing apparatus comprising:
drive means, including a lead screw;
an assembly mounted for movement longitudinally of said lead screw;
a first operating member pivotally coupled to said assembly at a first pivot point, said first operating member being normally engaged with said lead screw;
first spring means for biasing said first operating member toward engagement with said lead screw;
a second operating member, said second operating member being centrally and pivotally mounted on said first operating member at a second pivot point and said second operating member having first and second arms extending longitudinally of said lead screw and engageable therewith;
second spring means operative normally to maintain a first arm of said second operating member in engagement with said lead screw;
control means selectively operative to disengage said first arm of said second operating member from said lead screw and to engage said second arm of said second operating member with said lead screw;
and means operative to pivot and thereby disengage said first operating member from said lead screw in opposition to said first spring means whereby the pivoting action between said first operating member and said second operating member moves said assembly in a first direction when the first arm of said second operating member is in its normally engaged position with said lead screw and whereby the pivotnig action between said first operating member and said second operating member moves said assembly in the opposite direction when the second arm of said second operating member is engaged with said lead screw.

3. Incrementing apparatus comprising:
drive means including a regularly toothed element;
an assembly mounted for movement longitudinally of said element;
a first operating member pivotally coupled to said assembly at a first pivot point, said first operating member being normally engaged with said element;
first spring means for biasing said first operating member toward engagement with said toothed element;
a second operating member, said second operating member being centrally and pivotally mounted on said first operating member at a second pivot point and said second operating member having first and second arms extending longitudinally of said element and engageable therewith;
second spring means operative normally to maintain a first arm of said second operating member in engagement with said element,
control means selectively operative to disengage said first arm of said second operating member from said element and to engage said second arm of said second operating member with said element;
and means operative to pivot and thereby disengage said first operating member from said element in opposition to said first spring means whereby the pivoting action between said first operating member and said second operating member moves said assembly in a first direction when the first arm of said second operating member is in its normally engaged position with said element and whereby the pivoting action between said first operating member and said second operating member moves said assembly in the opposite direction when the second arm of said second operating member is engaged with said element.

4. Incrementing apparatus comprising:
drive means including a lead screw;
an assembly mounted for movement adjacent said lead screw;
a first operating member pivotally coupled to sadi assembly at a first pivot point, said first operating member having a first detent extension normally engaged with said lead screw and said first operating member having a second extension;
spring means for biasing said detent toward engagement normally with said lead screw;
a second operating member, said second operating member being centrally and pivotally mounted at the extremity of the second extension of said first operating member at a second pivot point and said second operating member having first and second arms extending in opposite directions from said extremity for engagement with said lead screw;
second biasing means operative normally to maintain a first arm of said second operating member in engagement with said lead screw;
actuating means operative to disengage said first arm of said second operating member from said lead screw and to engage said second arm of said second operating member with said lead screw;
and means operative to pivot and thereby disengage said first operating member from said lead screw in opposition to said spring means whereby the pivoting action between said first operating member and said second operating member moves said assembly in a first direction when the first arm of said second operating member is in its normally engaged position with said lead screw and whereby the pivoting action between said first operating member and said second operating member moves said carrier assembly in the opposite direction when the second arm of said second operating member is engaged with said lead screw.

5. Incrementing apparatus comprising:
drive means including a lead screw;
a carrier assembly mounted for movement longitudinally of said lead screw;

a first operating member pivotally coupled to said carrier assembly at a first pivot point, said first operating member having a first detent extension normally engaged with said lead screw and said first operating member having a second extension;

spring means for biasing said detent normally toward engagement with said lead screw;

a second operating member, said second operating member being centrally and pivotally mounted at the extremity of the second extension of said first operating member at a second pivot point and said second operating member having first and second arms extending generally longitudinally of said lead screw and engageable therewith;

first means operative normally to maintain a first arm of said second operating member in engagement with said lead screw;

second means operative to disengage said first arm of said second operating member from said lead screw and to engage said second arm of said second operating member with said lead screw;

and means operative to pivot and thereby disengage said first operating member from said lead screw in opposition to said first spring means whereby the pivoting action between said first operating member and said second operating member moves said carrier assembly in a first direction when the first arm of said second operating member is in its normally engaged position with said lead screw and whereby the pivoting action between said first operating member and second operating member moves said carrier assembly in the opposite direction when the second arm of said second operating member is engaged with said lead screw.

6. A combination forward-backspacing mechanism for dictating apparatus comprising:

drive means including a lead screw, said lead screw being threaded with a pitch of predetermined increment between adjacent threads;

a recording media transducer in said apparatus, said transducer being mounted on a platform positioned adjacent said lead screw for movement longitudinally of said lead screw;

a first member, said member being pivotally mounted on said platform and having a first arm extending longitudinally of said platform and said lead screw, and a second arm extending from said platform, said first arm having near its extremity a detent surface normally engaged in a thread of said lead screw, and said second arm having a pivot stud near its extremity;

a second member, centrally and pivotally mounted on the pivot stud of the second arm of said first member, said second member having a first arm extending in the same direction as the first arm of said first member and a second arm extending in a direction opposite to the first arm of said first member and said first arm of said second member having a detent surface normally engaged in a thread of said lead screw, and said second arm of said second member having a detent surface positioned for engagement with but normally disengaged from said lead screw;

a first spring of relatively stronger characteristic coupled between said platform and the first arm of said first member for biasing the detent surface of the first arm of said first member toward engagement with said lead screw;

a second spring of relatively weaker characteristic coupled between the second arm of said first member and the second arm of said second member for biasing the detent surface of said first arm of said second member toward engagement with said lead screw;

first actuating means positioned to move the first arm of said first member out of engagement with said lead screw to thereby pivot said first member away from said platform in opposition to said first spring so that said first spring exerts a force tending to restore said first member toward said platform;

second actuating means positioned to pivot said second member in opposition to said second spring and thereby move the second arm of said second member into engagement with said lead screw;

a microphone handpiece, said handpiece having a number of buttons for effecting control of said dictating apparatus;

means responsive to operation of a particular one of said buttons for operating said first actuating means alone to thereby move said first member out of engagement with said lead screw, drag the detent on the first arm of said second member from one tooth to another on said lead screw one increment in a backspacing direction and to thereafter enable movement of said platform in said backspace direction when said first actuating means is released;

and means responsive to operation of another one of said buttons for operating said second actuating means and said first actuating means in that sequence, to first engage the second arm of said second member with said lead screw, to thereafter disengage the first arm of said first member from said lead screw and to thereby enable movement of said platform one increment in a forward spacing direction, with the normally engaged arms of said first and second members also becoming engaged with said lead screw one increment in said forward direction and responsive to force exerted by said first and second springs, the differences in characteristics of said first and second springs insuring that the position reached by said platform by operation of the mechanism is maintained when said first and second members again become engaged with said lead screw.

7. A combination forward-backspacing mechanism, comprising:

a lead screw drive, said lead screw being threaded with a pitch of predetermined increment between adjacent threads;

a platform positioned adjacent said lead screw for movement longitudinally of said lead screw;

a first member, said member being pivotally mounted on said platform and having a first arm extending longitudinally of said platform and said lead screw, and a second arm extending substantially perpendicularly from said platform, said first arm having near its extremity a detent surface normally engaged in a thread of said lead screw and said second arm having a pivot stud near its extremity;

a second member centrally and pivotally mounted on the pivot stud of the second arm of said first member, said second member having a first arm extending in the same direction as the first arm of said first member and a second arm extending in a direction opposite to the first arm of said first member, said first arm of said second member having a detent surface normally engaged in a thread of said lead screw, and said second arm of said second member having a detent surface positioned for engagement with, but normally disengaged from said lead screw;

a first spring of relatively stronger characteristic coupled between said platform and the first arm of said first member for biasing the detent surface of the first arm of said first member toward engagement with said lead screw;

a second spring of relatively weaker characteristic coupled between the second arm of said first member and the second arm of said second member for biasing the detent surface of the first arm of said second member toward engagement with said lead screw;

first actuating means positioned to move the first arm of said first member out of engagement with said lead screw to thereby pivot said first member away from said platform in opposition to said first spring so that said first spring exerts a force tending to restore said first member toward said platform;

second actuating means positioned to move the second arm of said second member into engagement with said lead screw in opposition to said second spring;

means for operating said first actuating means alone to thereby move said first member out of engagement with said lead screw, drag the first arm of said second member from one tooth to another on said lead screw one increment in a backspacing direction to thereafter enable movement of said platform one increment in a backspace direction when said actuating means is released;

and means for operating said second actuating means and said first actuating means in that sequence to first engage the second arm of said second member with said lead screw, to thereafter disengage the first arm of said first member from said lead screw and to thereby enable movement of said platform one increment in a forward spacing direction with the normally engaged arms of said members also becoming engaged with lead screw one increment in said forward direction and with a priority of engagement determined by the differences in characteristics of said first and second springs.

8. Incrementing apparatus, comprising:

an incremental toothed element;

a movable assembly;

a single operating member pivotally and directly coupled to said assembly at a first pivot point and positioned for engagement or disengagement with said element by oscillatory pivoting about said pivotal coupling;

means for biasing said member toward engagement with said element;

auxiliary means pivotally mounted on said member at a second pivot point further interconnecting said member with said element, said auxiliary means being settable to a first pivotal interconnecting condition in which oscillatory pivoting of said member effects movement of said assembly in one direction and to a second pivotal interconnecting condition in which osciliatory pivoting of said member effects movement of said assembly in another direction;

direction control means for selectively controlling said auxiliary means to establish either of said first or second interconnecting conditions;

and actuating means for oscillating said single operating member in opposition to said biasing means in order to move said assembly in the direction selected by said direction control means.

9. Incrementing apparatus, comprising:

an incremental drive element;

an assembly mounted for movement adjacent said element;

a single operating member pivotally and directly coupled to said assembly at a first pivot point, said operating member being positioned for engagement or disengagement with said element by oscillatory pivoting about said pivotal coupling;

means for biasing said member toward engagement with said element;

auxiliary means pivotally mounted on said member at a second pivot point further interconnecting said operating member with said element, said auxiliary means being settable to a first pivotal interconnecting condition in which oscillatory pivotal movement of said operating member effects movement of said assembly in one direction and to a second pivotal interconnecting condition in which oscillatory pivotal movement of said operating member effects movement of said assembly in a second direction;

actuating means operative to disengage said operating member from said element in opposition to said biasing means and about its pivotal connection with said assembly in order to effect movement of said assembly;

and control means operative to condition said auxiliary means to its first condition or its second condition.

10. Incrementing apparatus, comprising:

a toothed element;

an assembly mounted for movement adjacent said element;

a single operating member pivotally coupled to said assembly at a first pivot point, said operating member being positioned for engagement with and disengagement from said element by oscillatory pivoting about said pivotal coupling;

means for biasing said operating member toward engagement with said element;

an auxiliary member having a pair of extremities extending therefrom, said auxiliary member being pivotally mounted on said operating member at a second pivot point in a position for either of said extremities to engage said element to thereby further interconnect said operating member with said toothed element, the engagement of one of said extremities establishing a first pivotal interconnecting condition in which oscillatory pivoting of said single operating member effects movement of said assembly in one direction, and the engagement of the other of said extremities establishing a second pivotal interconnecting condition in which oscillatory pivoting of said single operating member effects movement of said assembly in the opposite direction;

direction control means for selectively controlling said auxiliary member to engage said one or the other extremities of said auxiliary member with said element;

and actuating means for oscillating said single operating member in opposition to said biasing means in order to move said assembly in the direction selected by said direction control means.

11. The apparatus of claim 10 wherein:

said toothed element has a plurality of teeth incrementally spaced at regular intervals.

12. The apparatus of claim 11 wherein:

the extremities on said auxiliary member extend in substantially opposite directions; and wherein movement of said assembly occurs in opposite directions.

13. The apparatus of claim 11 wherein:

said toothed element is a lead screw; wherein said assembly carries a transducer; and further comprising means to rotate said lead screw to thereby move said assembly by engagement of said operating member with said lead screw.

14. Incrementing apparatus for a dictating machine, comprising:

drive means including a lead screw;

a recording media transducer;

a carrier assembly for said transducer, said assembly being mounted for movement longitudinally of said lead screw;

an operating member pivotally coupled to said assembly at a first pivot point, said operating member having a detent positioned for engagement with and disengagement from said lead screw by oscillatory pivoting about said pivotal coupling;

spring means for biasing said operating member detent toward engagement with said lead screw;

an auxiliary member having oppositely extending backspace and forward space pawls, said auxiliary member being pivotally mounted on said operating member at a second pivot point in a position for either of said pawls to engage said lead screw to thereby further interconnect said operating member with said lead screw, the engagement of said backspace pawl establishing a first pivotal interconnection in which oscillatory pivoting of said operating member effects movement of said assembly in a backspace direction, and the engagement of said forward space pawl establishing a second pivotal interconnection in which oscillatory pivoting of said operating member effects movement of said assembly in a forward direction;

direction control means for normally maintaining said backspace pawl in engagement with said lead screw to thereby establish said first interconnection, and operable to disengage said backspace pawl and to engage said forward space pawl with said lead screw to thereby establish said second interconnection;

and actuating means for oscillating said operating member in opposition to said spring means in order to move said assembly in the direction established by said direction control means.

15. Incrementing apparatus, comprising:

a toothed element;

an assembly mounted for movement adjacent said element;

an operating member pivotally coupled to said assembly at a first pivot point, said operating member being positioned for engagement with and disengagement from said element by pivoting about said pivotal coupling;

spring means for normally biasing said operating member toward engagement with said toothed element;

an auxiliary member having oppositely extending extremities, said auxiliary member being pivotally mounted on said operating member at a second pivot point with a first one of said extremities being normally engaged with said toothed element to establish a first interconnection and pivotal relationship of said operating member and said assembly in which disengagement of said operating member will effect movement of said assembly in a first direction, the second one of said extremities being normally disengaged from said element but positioned for engagement with said element to establish a second interconnection and pivotal relationship of said operating member and said assembly in which disengagement of said operating member will effect movement of said assembly in a second direction;

direction control means operative to engage and disengage said first and second extremities in order to selectively establish said first and second interconnections;

and actuating means for pivoting and thereby disengaging said operating member from said toothed element in opposition to said spring biasing means in order to move said assembly in the direction established by said direction control means.

16. Incrementing apparatus for a dictating machine having a recording media and a transducer mounted for relative movement comprising:

means for driving said recording media and said transducer, said drive means including a lead screw extending adjacent said recording media;

a carrier assembly for said transducer, said assembly being mounted for movement longitudinally of said lead screw;

an operating member pivotally coupled to said assembly at a first pivot point, said operating member being positioned for engagement with and disengagement from said lead screw by pivoting about said pivotal coupling;

spring means for biasing said operating member toward engagement with said lead screw;

an auxiliary member having oppositely extending arms, said auxiliary member being pivotally mounted on said operating member at a second pivot point with a first arm establishing a first pivotal interconnection of said operating member and said assembly in which disengagement of said operating member will effect movement of said assembly in a forward direction and a second arm establishing a second pivotal interconnection of said operating member and said assembly in which disengagement of said operating member effects movement of said assembly in a backspace direction;

a hand piece for said dictating machine, said hand piece having a number of buttons for controlling machine operations including a backspace button and a forward space button;

means operative normally to maintain said second arm of said auxiliary member in positive engagement with said lead screw means;

first actuating means operative in response to depression of said forward space button to engage said first arm of said auxiliary member with said lead screw and to pivot and thereby disengage said operating member from said lead screw in opposition to said spring biasing means, whereby the pivotal action established by said first interconnection moves said assembly in a forward direction;

and second actuating means operative in response to depression of said backspace button to only disengage said operating member from said lead screw in opposition to said spring biasing means, whereby the pivotal action established by said normally maintained second interconnection moves said assembly in a backspace direction.

References Cited

UNITED STATES PATENTS 2,179,577 11/1939 Lucker -------------- 254—111

OTHER REFERENCES

IBM Technical Disclosure Bulletin, vol. 6, No. 4, page 21, September 1963 (copy in Class 274—13).

LEONARD FORMAN, *Primary Examiner.*

JOEL M. FREED, *Assistant Examiner.*